Oct. 19, 1965  M. D. BURROWS ETAL  3,212,541
CUTTING GUIDE
Filed Feb. 19, 1963  2 Sheets-Sheet 2
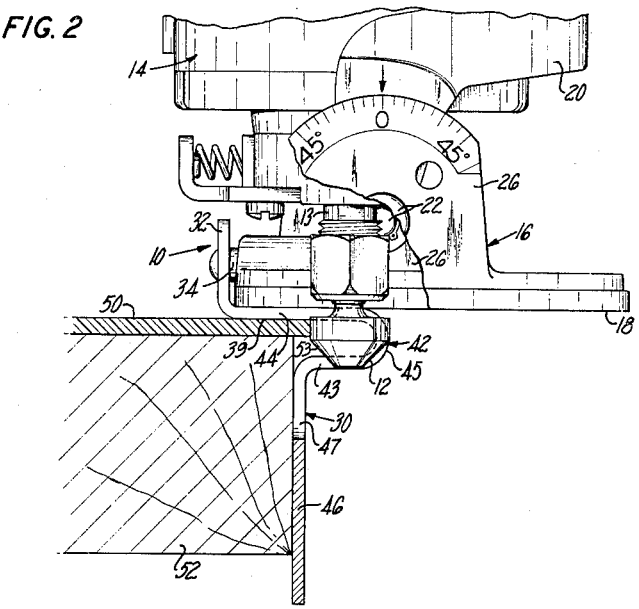
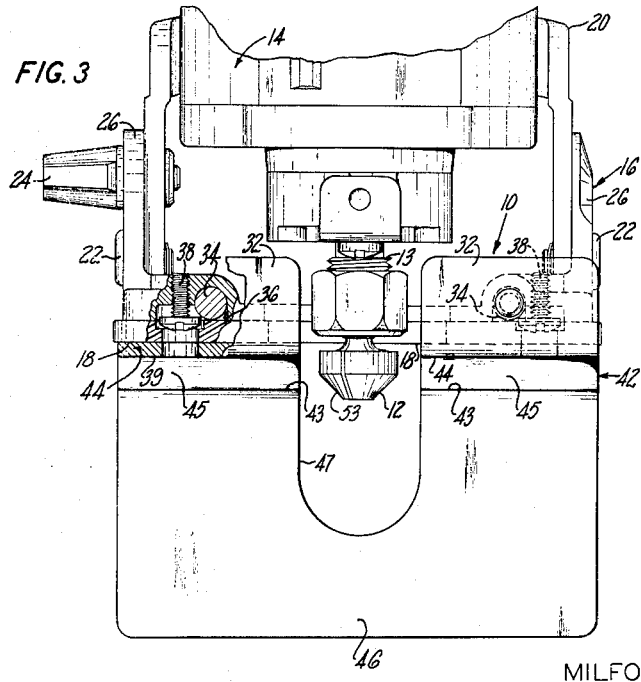
INVENTORS
MILFORD D. BURROWS
ORESTES M. DAVEY
BY Lindsey, Prutzman and Hayes
ATTORNEYS 3,212,541
CUTTING GUIDE
Milford D. Burrows, Avon, and Orestes M. Davey, New Britain, Conn., assignors to The Stanley Works, New Britain, Conn., a corporation of Connecticut
Filed Feb. 19, 1963, Ser. No. 259,676
3 Claims. (Cl. 144—134)

This invention relates to a power tool having a rotary cutting bit adaptable for trimming the edge of a workpiece and is more particularly concerned with a power tool attachment for guiding the cutting bit along the workpiece.

A principal aim of the present invention is to provide a cutting guide attachment of the type described which has particular usefulness with a power tool of the router or trimmer variety having a base adjustable for varying the cutting angle and depth for guiding the power tool for cutting in hard-to-reach locations.

Another aim of the present invention is to provide a new and unique cutting attachment of the type described which may be economically manufactured and readily assembled on conventional power tools for providing increased cutting accuracy and handling ease.

A further aim of the present invention is to provide a new and improved cutting guide attachment of the type described which is capable of guiding the cutting bit in an accurate and safe manner and which has an economical and durable construction giving reliable service over a long and useful life.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 2 is a side elevation view, partly broken away and partly in section, showing a portion of the power tool assembly installed for cutting a ledge on a surface veneer piece of a table; and FIG. 3 is a left side elevation view of a portion of the power tool assembly as shown in FIG. 2.

Figure 1:
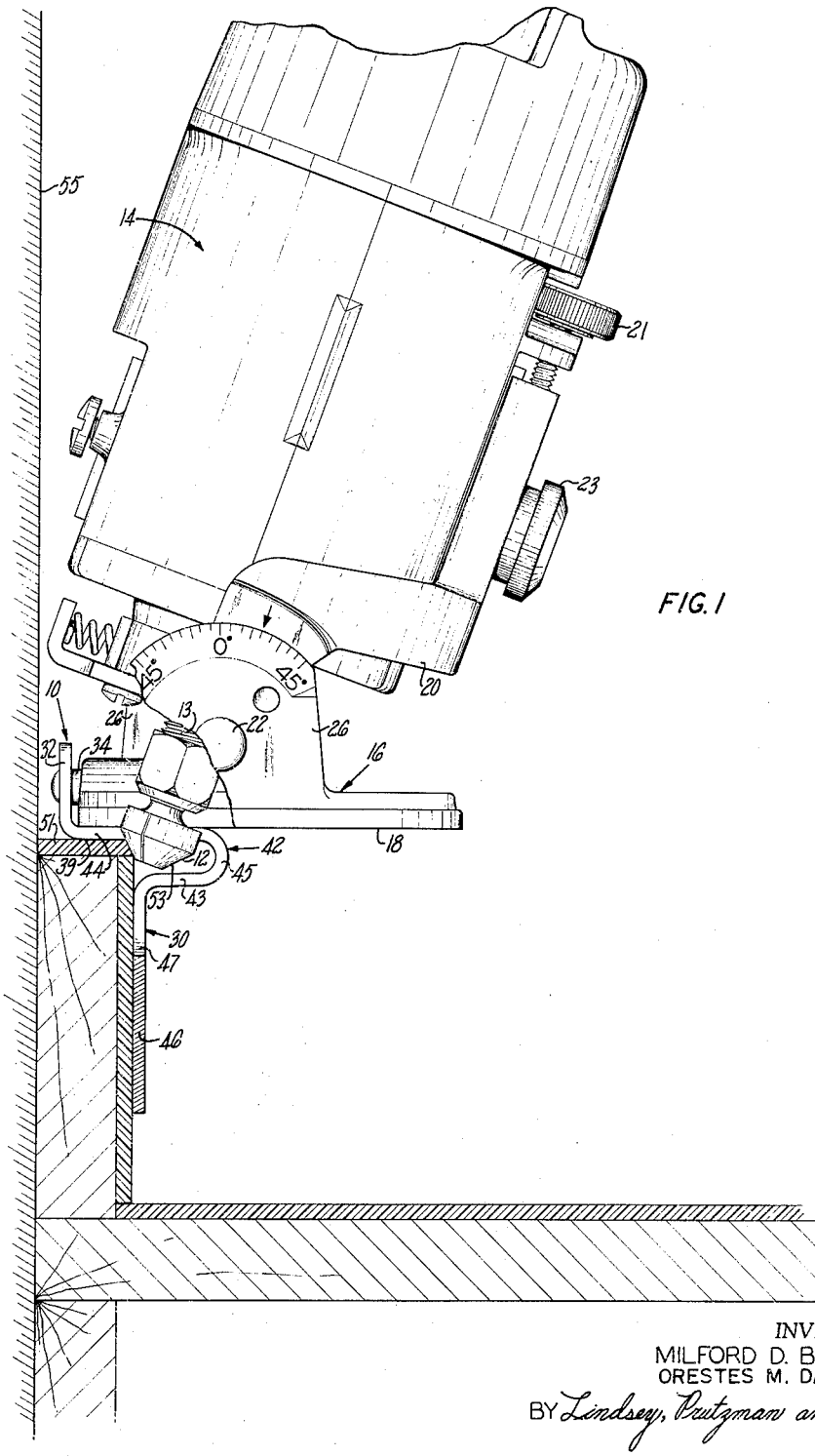
FIG. 1 is a side elevation view, partly broken away and partly in section, of a power tool assembly including an embodiment of the cutting guide of the present invention and installed for cutting the outer edge of a veneer piece providing the top of a counter backsplash.

Referring now to the drawings in detail, an embodiment 10 of the cutting guide of the present invention is shown assembled upon a portable power tool of the type having a depending rotary cutting bit 12 mounted on an elongated spindle 13 which is driven by a motor (not shown) supported within a motor housing 14. Attached to the motor housing is a housing or tool guide 16 with a laterally extending planar guide base 18 that is adapted to provide in the usual manner for guiding the movement of the tool along a workpiece surface. The housing guide 16 is pivotally mounted about a laterally extending axis on a housing yoke member 20 by a pair of pins 22, and may be pivotally adjusted for varying the cutting angle of the bit 12. The housing guide 16 is locked in a selected position by means of a wing screw 24 (FIG. 3) threaded into the yoke 20 and received within an arcuate slot (not shown) in a cooperating upstanding ear 26 of the housing guide 16. The yoke member 20 is mounted on the housing 14 for longitudinal adjustment for varying the axial position of housing guide 16. Accurate adjustment of the guide is obtained by an adjustment screw 21 threaded into the upper end of the yoke member, and selective locking of the yoke member is provided by a locking knob 23 threaded on a stud (not shown) received within an elongated slot in the yoke.

The cutting guide attachment of the present invention is preferably constructed from a sheet metal plate and is contoured to provide a generally T-shaped guide 30 depending from upstanding ears 32. For securing the cutting guide to the housing guide 16, a pair of laterally extending pins 34 riveted to the ears 32 are received within complementary openings 36 in the end of the housing guide. The pins 34 are laterally adjustable within the openings 36 and as seen in FIG. 3 are suitably held by the engagement of the heads of locking screws 38 threaded upwardly into the housing guide 16.

The T-shaped guide 30 includes a lateral base portion 44 engageable with the base 18 and having a lateral guide surface 39 engageable with the workpiece. A guide portion or lateral control member 46 of the T-shaped guide depends in a plane perpendicular to the lateral base portion 44 and planar base 18 and parallel to the pivotal axis of the housing guide 16. As seen in FIG. 2, the lateral control member 46 is spaced below the base portion to avoid interference with a projecting surface veneer piece 50. A generally U-shaped connector portion 42 of the guide 30 has a lateral part 43 extending from the guide portion 46 and a spacer part 45 providing the spacing of the guide portion 46 below the lateral base portion 44. The guide 30 is centrally slotted at 47 to receive the cutting bit 12 and to give complete angular freedom to the cutting bit as the housing guide 16 is adjusted axially and pivotally on the motor housing. Preferably, the connector portion 42 is dimensioned, as seen in FIG. 2, to extend laterally beyond the cutting bit 12 when it is located in the upright position to provide a safety guard therefor.

An important application of the cutting guide is illustrated in FIG. 1 wherein it is used for controlling the movement of the bit for cutting the outer edge of a veneer piece 51 forming a counter backsplash top. For this purpose the lower beveled cutting edge 53 of the bit 12 (here shown to be 45°) is appropriately located to perform the desired cutting by proper angular and/or longitudinal adjustment of the housing guide 16, and where necessary, lateral adjustment of the cutting guide 10 on the housing guide 16. As a result of the adjustment, the motor housing is moved away from a wall surface 55 with which the backsplash is shown associated thereby illustrating how the cutting may be performed even in such difficult to reach applications.

Another application of the cutting guide is illustrated in FIG. 2 wherein the cutting guide provides for controlling the upper edge of the cutting bit 12 along the edge of a table veneer piece 50 for trimming a peripheral ledge above the table base 52. Such is particularly useful where either molding or additional veneer is to be placed under the veneer ledge for improving the over-all apperance of the edge of the table.

It can be readily seen that the cutting guide attachment of the present invention is capable of being used with differently contoured cutting bits and manufactured in numerous sizes for various applications and is particularly useful for guiding the cutting bit for cutting the veneer piece of a counter backsplash top or a ledge on table surface veneer. The cutting guide additionally is of economical and yet sturdy construction and can be readily assembled on and disassembled from a conventional power tool of the router or trimmer variety without the necessity of specially constructing the power tool other than for attaching the cutting guide.

As will be apparent to persons skilled in the art, various modifications and adaptations of the structure above described will become readily apparent without depar-

We claim:

1. A portable power tool for trimming the edge of a workpiece surface veneer having a depending rotary cutting bit and a tool guide adjustable for pivotal and axial movement relative to the cutting bit for varying the cutting angle and depth of the bit, shaft means on said power tool pivotally mounting said tool guide and forming the axis of said pivotal movement, and an attachment for guiding the bit along an edge of a workpiece comprising, a sheet metal cutting guide plate with a first lateral control plate portion depending below the cutting bit having a guide surface engageable with the edge of the workpiece for guiding the portable power tool therealong, said guide surface lying in a plane parallel to the pivotal axis of the tool guide and with said pivotal axis offset laterally outwardly thereof whereby the pivotal axis is guided parallel to and offset from the workpiece edge, a second plate portion extending normal to and inwardly from the plane of the guide surface and engageable with the tool guide and the surface veneer for guiding the tool therealong, and a generally U-shaped connector plate portion spaced laterally outwardly of the guide surface for noninterference with the surface veneer, said connector plate portion connecting the first and second plate portions, and means fixing the second plate portion to the tool guide for pivotal and axial adjustment of the sheet metal cutting guide relative to the cutting bit whereby the angle and deph of cut can be selected by pivotal and axial adjustment of the tool guide relative to the cutting bit.

2. The portable power tool of claim 1 wherein the means fixing the second plate to the tool guide provides for adjustment of the attachment in a direction perpendicular to the plane of the guide surface.

3. A power tool for trimming the edge of a workpiece surface veneer having a depending rotary cutting bit and a base extending laterally of the axis of rotation thereof mounted for pivotal movement for varying the cutting angle of the bit, shaft means on said power tool pivotally mounting said tool guide and forming the axis of said pivotal movement, and an attachment comprising, a sheet metal cutting guide member having a mounting portion, a guide portion depending below the cutting bit having a planar surface engageable with an edge of the workpiece for guiding the cutting bit along the edge of the surface veneer and with the guide portion being mounted substantially parallel to but offset laterally from the pivotal axis of the base, and a connector portion with a first lateral part extending from the guide portion and a second upstanding part connected to the mounting portion, said connector portion being axially slotted for receiving the cutting bit and for partially surrounding the cutting bit to provide a guard therefor, and means for removably securing the mounting portion to the base of the power tool.

References Cited by the Examiner

UNITED STATES PATENTS

| | | | |
|---|---|---|---|
| 2,630,152 | 3/53 | Turnbull | 144—136 |
| 2,635,655 | 4/53 | Linstead | 144—134 |
| 2,693,207 | 11/54 | Berge | 144—136 |
| 2,970,618 | 2/61 | Mitchell | 144—136 |

LESTER M. SWINGLE, *Primary Examiner.*

WILLIAM W. DYER, JR., *Examiner.*